(12) United States Patent
Suzuki

(10) Patent No.: US 6,905,265 B2
(45) Date of Patent: Jun. 14, 2005

(54) METHOD OF AND APPARATUS FOR MANUFACTURING PACKAGED CARTRIDGE PRODUCT

(75) Inventor: Chiaki Suzuki, Minamiashigara (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 10/684,682

(22) Filed: Oct. 15, 2003

(65) Prior Publication Data

US 2004/0081454 A1 Apr. 29, 2004

(30) Foreign Application Priority Data

Oct. 15, 2002 (JP) ........................................ 2002-300671

(51) Int. Cl.⁷ ............................ G03B 17/26; B65B 5/00; B65B 63/04; B67B 7/28
(52) U.S. Cl. ............................ 396/511; 53/118; 53/281; 53/287; 53/430; 53/471
(58) Field of Search ..................... 53/118, 281, 287, 53/430, 471, 473, 485; 29/773, 806; 396/511–513

(56) References Cited

U.S. PATENT DOCUMENTS

| | | |
|---|---|---|
| 3,714,761 A | 2/1973 | Herford et al. |
| 5,669,205 A | 9/1997 | Rice et al. |
| 5,815,739 A * | 9/1998 | Marra et al. .................... 396/6 |
| 6,092,352 A * | 7/2000 | Tanaka ......................... 53/430 |
| 6,393,695 B2 * | 5/2002 | Esaki ........................... 29/784 |
| 6,519,839 B1 | 2/2003 | Suzuki et al. |

FOREIGN PATENT DOCUMENTS

| | | |
|---|---|---|
| JP | 47-26127 | 10/1972 |
| JP | 9-5947 A | 1/1997 |
| JP | 10-20454 A | 1/1998 |
| JP | 11-265043 A | 9/1999 |
| JP | 2001-18914 A | 1/2001 |
| JP | 2001-281808 A | 10/2001 |

* cited by examiner

Primary Examiner—W. B. Perkey
(74) Attorney, Agent, or Firm—Sughrue Mion, PLLC

(57) ABSTRACT

In a loading position of a manufacturing apparatus, a cartridge attracted and held by a magnet of a holding member of a cartridge loading mechanism is held on a vertically movable table of a case holding device while being guided by a tapered inner circumferential surface of a rotating guide tubular body, and is inserted into a case disposed in a guide tubular body while being guided by a tapered opening. The cartridge that is inserted in the case is attracted by a magnet mounted on the vertically movable table and having stronger magnetic forces than the magnet, and is released from the magnetic attraction by the magnet and loaded into the case.

10 Claims, 13 Drawing Sheets

METHOD OF AND APPARATUS FOR MANUFACTURING PACKAGED CARTRIDGE PRODUCT

BACKGROUND OF THE INVENTION

1. Field of the Invention

The present invention relates to a method of and an apparatus for manufacturing a packaged cartridge product, and more particularly to a method of and an apparatus for manufacturing a packaged cartridge product by automatically loading a cartridge which houses therein a roll of photographic film into a case and mounting a case cap on the case.

2. Description of the Related Art

Heretofore, photographic films are processed and packaged by performing various processes which include cutting off a film of fixed length, winding the film of fixed length into a film scroll, inserting the film scroll into a cartridge, loading the cartridge into a case, and closing the case with a case cap.

In order to automatically insert the cartridge into the case, either one of the cartridge or the capsule (case) is rotated around the longitudinal axis of the cartridge at the same time the cartridge starts being inserted, and the leader (film end) of the film is wound around the cartridge by relative motion of the leader and the rim of the capsule, thereby loading the cartridge and the leader of the film into the capsule. The cap (case cap) is firmly pressed into the capsule which has been loaded with the cartridge so as to engage the open end of the capsule. For details, reference should be made to Japanese laid-open patent publication No. 9-5947.

According to the disclosure of Japanese laid-open patent publication No. 9-5947, when the cartridge is loaded into the capsule, the cartridge that is being delivered into the capsule is attracted by a magnetic support head. The cartridge that has been loaded in the capsule is forcibly released from the magnetic support head by an application of compressed air, and remains loaded in the capsule. For pressing the cap to engage in the capsule and closing the cap, the cap is loosely supported in the open end of the capsule, and then while the capsule is being moved, the cap is resiliently pressed against the capsule by passing the capsule across a spring-loaded roller.

When the cartridge is loaded into the capsule, it has also been practiced to attract the cartridge with a suction pad for thereby holding the cartridge. For details, reference should be made to Japanese laid-open patent publication No. 2001-281808.

According to the technologies disclosed in Japanese laid-open patent publication No. 9-5947 and Japanese laid-open patent publication No. 2001-281808, however, a supply of compressed air is required for applying compressed air to the cartridge and a supply of negative-pressure air is required for attracting the cartridge. Therefore, the overall equipment that is required is relatively complex and large in size, and is relatively costly to manufacture.

According to the disclosure of Japanese laid-open patent publication No. 9-5947, furthermore, when the cap is pressed to engage in the capsule, the cap is pressed against the capsule by the spring-loaded roller as the capsule moves. Therefore, the pressing force applied to the cap tends to be unstable. In order to close the cap accurately and reliably, it is necessary to considerably increase the biasing force of the spring. However, the increased biasing force of the spring is liable to damage the cap and the capsule.

SUMMARY OF THE INVENTION

It is a general object of the present invention to provide a method of and an apparatus for manufacturing a packaged cartridge product by smoothly and reliably loading a cartridge into a case with a simple arrangement.

A principal object of the present invention to provide a method of and an apparatus for manufacturing a packaged cartridge product without the need for any actuator for inserting or removing a cartridge into or from a case.

Another object of the present invention to provide a method of and an apparatus for manufacturing a packaged cartridge product by easily and reliably mounting a case cap on a case without causing damage to the case cap and the case.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A method of manufacturing a packaged cartridge product according to an embodiment of the present invention and a manufacturing apparatus which carries out the method will be described below in detail with reference to the accompanying drawings.

Figure 1:
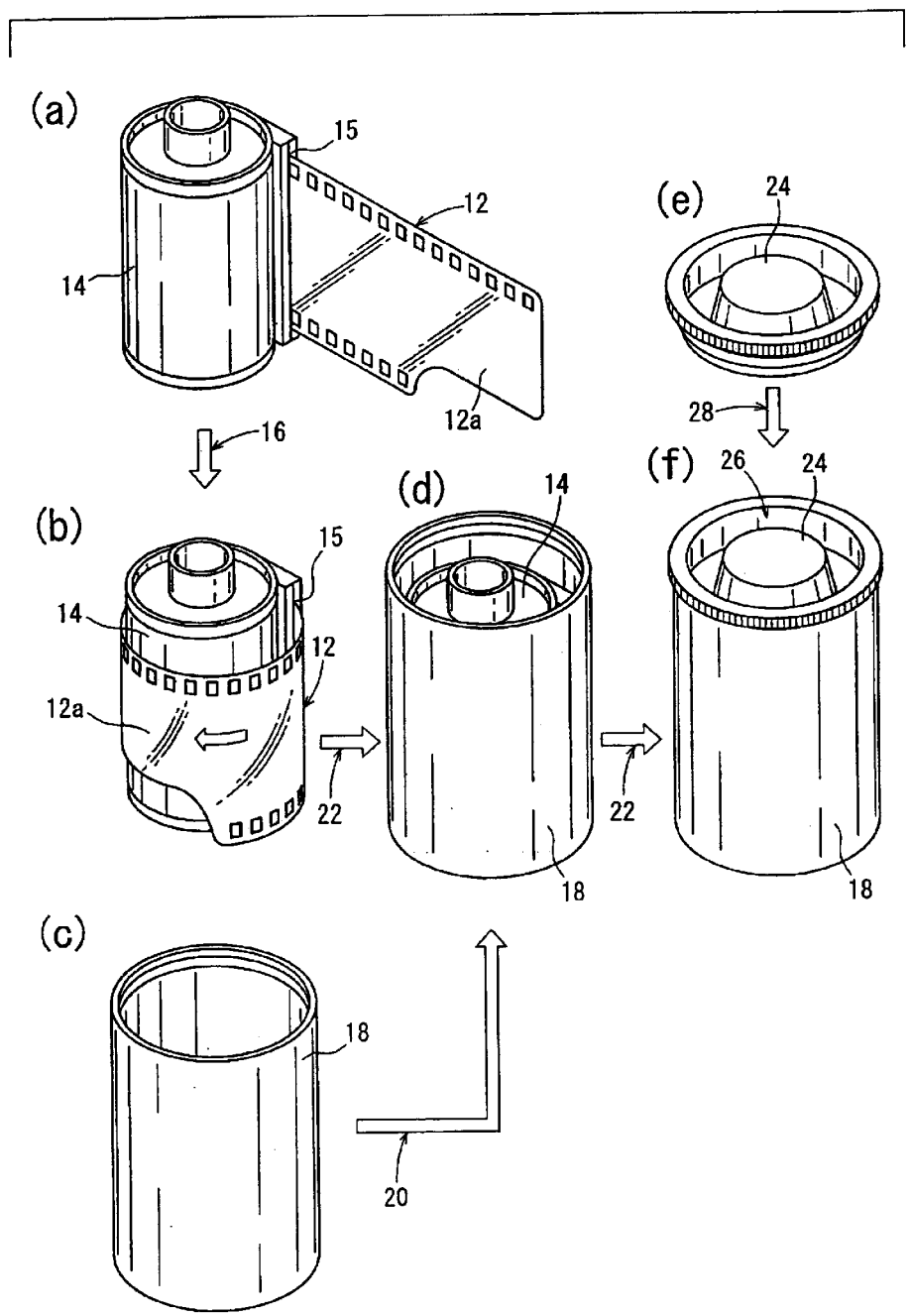
FIG. 1 is a perspective view illustrative of a method of manufacturing a packaged cartridge product according to an embodiment of the present invention.
Figure 2:
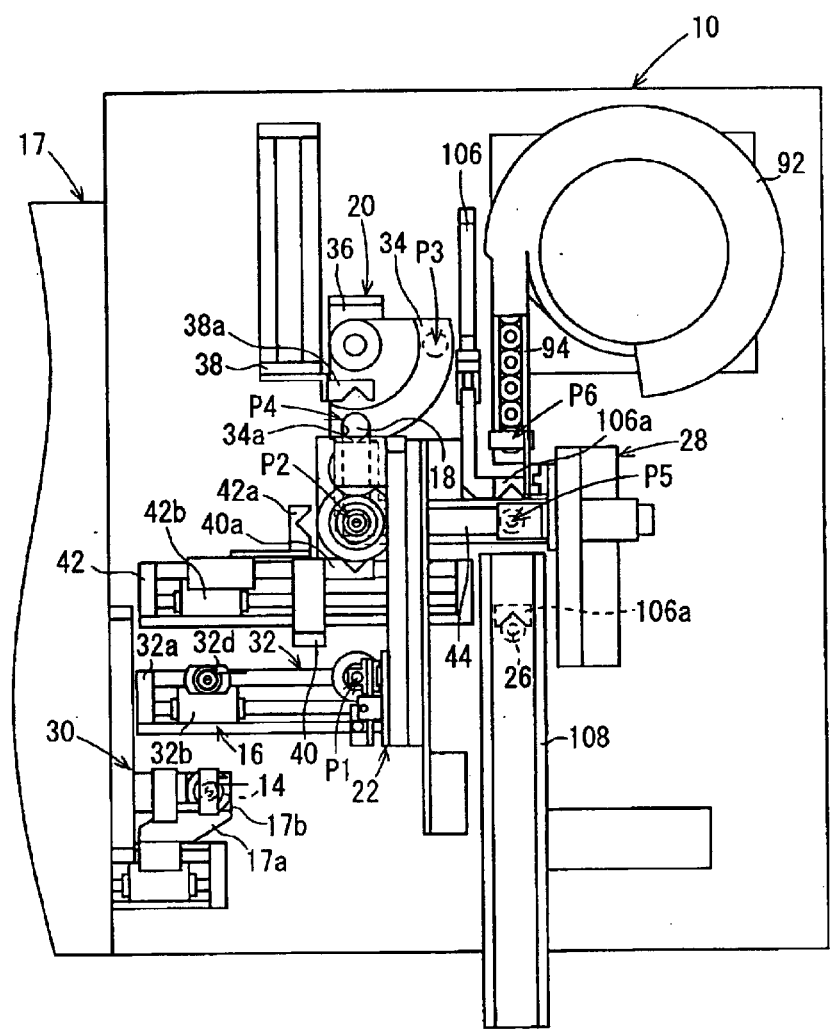
FIG. 2 is a plan view of a manufacturing apparatus which carries out the method shown in FIG. 1.

FIG. 1 is a perspective view illustrative of a method of manufacturing a packaged cartridge product according to an embodiment of the present invention, and FIG. 2 is a plan view of an apparatus for manufacturing a packaged cartridge product (hereinafter referred to as "manufacturing apparatus") 10 which carries out the method shown in FIG. 1.

The manufacturing apparatus 10 comprises a cartridge feed mechanism (first feed mechanism) 16 for transferring a cartridge 14 which is delivered from a film winding mechanism 17 by a transfer mechanism 17b while being guided by a guide mechanism 17a and feeding the cartridge 14 to a cartridge removal position P1, a case feed mechanism (second feed mechanism) 20 for supplying a case 18, which is to be loaded with the cartridge 14, to a position below a loading position P2 and feeding the case 18 to a case cap mounting position P5 for mounting a case cap 24, a cartridge loading mechanism (loading mechanism) 22 for holding and delivering a cartridge 14 to a loading position P2, winding an end 12a of a fixed-length film 12 projecting from the cartridge 14 around the cartridge 14, and inserting the cartridge 14 into a case 18, and a case cap mounting mechanism (mounting mechanism) 28 for mounting a case cap 24 in an open end of a case 18 that is loaded with a cartridge 14, thereby providing a packaged product 26.

As shown in FIGS. 2 through 6, the cartridge feed mechanism 16 has a cartridge transfer unit 30 for transferring a cartridge 14 that is delivered by the transfer mechanism 17b, and a cartridge feeder 32 for feeding a cartridge 14 to the cartridge loading mechanism 22, the cartridge feeder 32 having a bucket 32a for placing therein a cartridge 14 transferred from the cartridge transfer unit 30.

Figure 3:
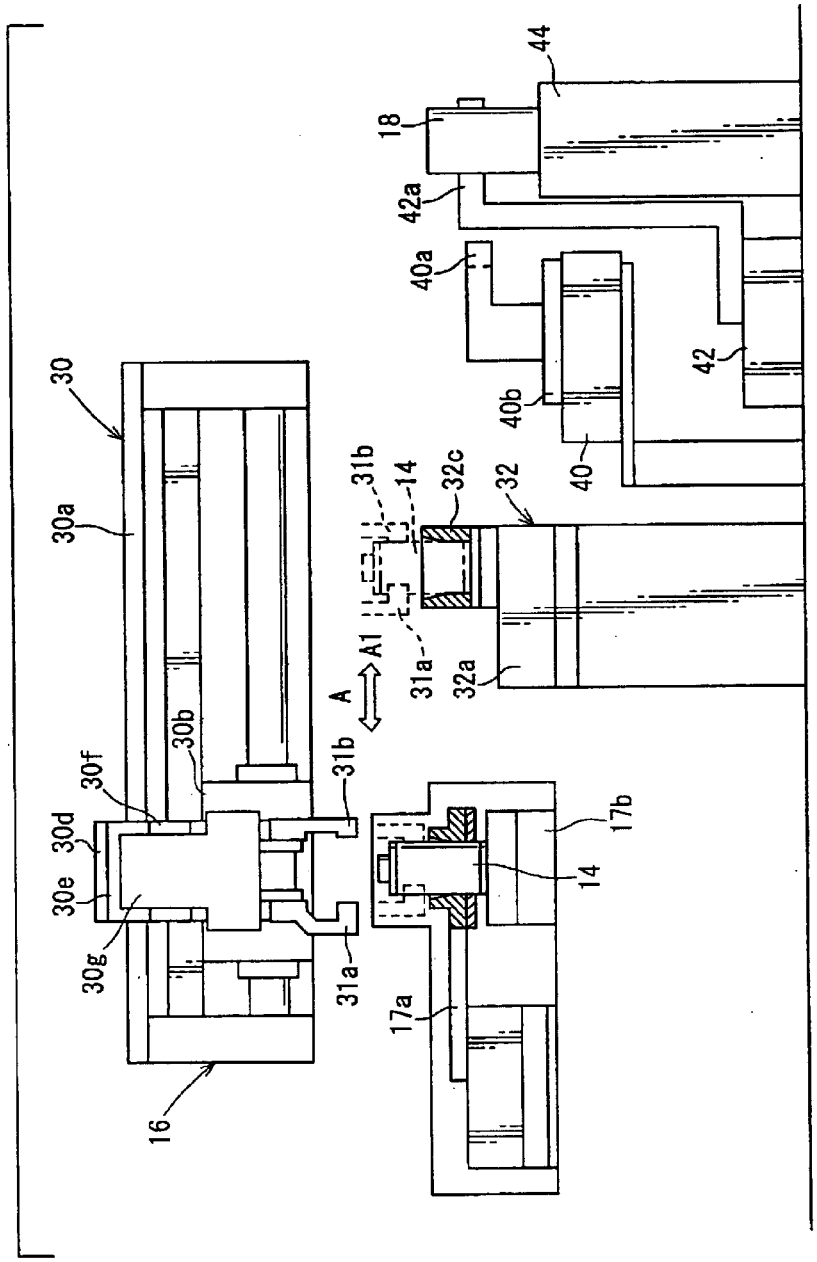
FIG. 3 is a front elevational view of a cartridge feed mechanism of the manufacturing apparatus shown in FIG. 2.
Figure 4:
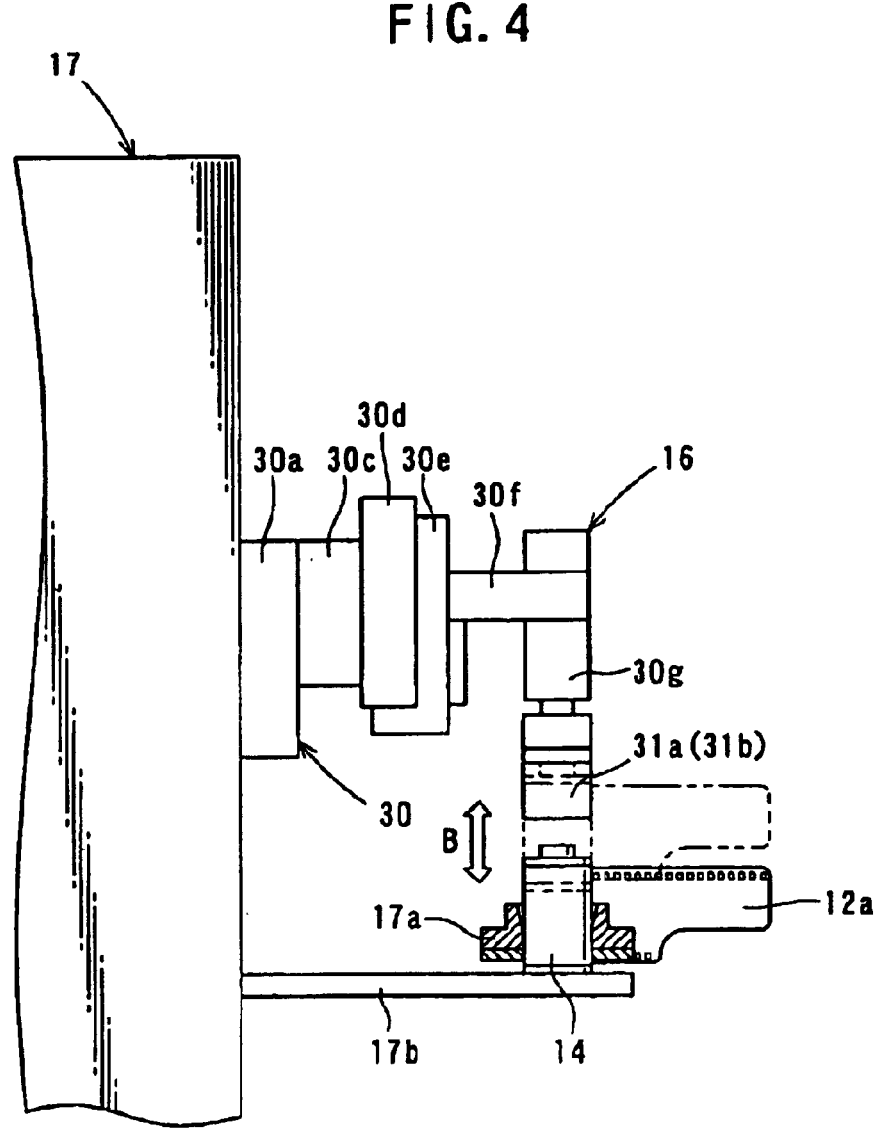
FIG. 4 is a fragmentary side elevational view of the cartridge feed mechanism shown in FIG. 3.

The cartridge transfer unit 30 comprises a cylinder 30a that is reciprocally movable between the transfer mechanism 17b and the cartridge feeder 32 in the directions indicated by the arrow A in FIG. 3, a movable body 30b that is reciprocally movable by the cylinder 30a, a cylinder 30d movably fixed to the carriage 30b by a bracket 30c for vertical movement in the directions indicated by the arrow B in FIG. 4, a movable body 30e vertically movable by the cylinder 30e, a cylinder 30g fixed to the movable body 30e by a bracket 30f, and a pair of clamp members 31a, 31b that is openable and closable by the cylinder 30g.

The clamp members 31a, 31b grip a cartridge 14 delivered by the transfer mechanism 17b and places the cartridge 14 into the bucket 32c of the cartridge feeder 32 with the end 12a of the fixed-length film 12 being oriented in a predetermined direction. The movable body 30b is positionally adjustable at each end of its reciprocally moving stroke, and is positioned at each stroke end by abutment against a stop (not shown) having a damping mechanism.

The cartridge feeder 32 comprises a cylinder 32a that is reciprocally movable between a position below a stroke end of the cartridge transfer unit 30 and the cartridge removal position P1, a movable body 32b that is reciprocally movable by the cylinder 32a, and a bucket 32c placed on the movable body 32b. The bucket 32c has a slit 32d (see FIG. 5) for holding therein the end 12a of the fixed-length film 12 that is oriented in a predetermined direction when the cartridge 14 transferred from the cartridge transfer unit 30 is placed in the bucket 32c. The cartridge 14 placed in the bucket 32c is fed to the cartridge removal position P1 when the movable body 32b moves. The movable body 32b is positionally adjustable at each end of its reciprocally moving stroke, and is positioned at each stroke end by abutment against a stop (not shown) having a damping mechanism.

Figure 5:
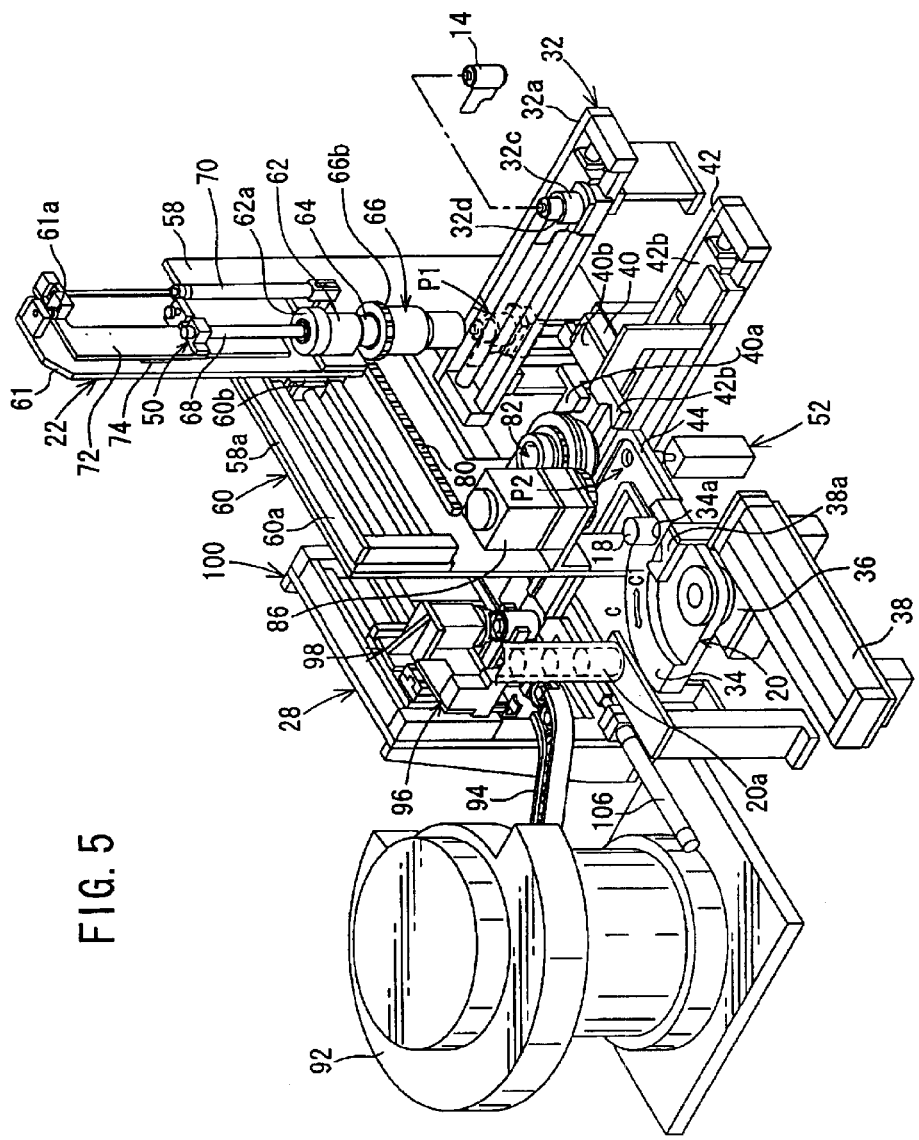
FIG. 5 is a perspective view of a case feed mechanism and a cartridge loading mechanism of the manufacturing apparatus shown in FIG. 2.

As shown in FIGS. 2, 5, and 7 through 9, the case feed mechanism 20 has a turntable 34 for placing thereon a case 18 fed from a parts feeder (not shown) along a supply path 20a in a case supply position P3 and feeding the case 18 to a case delivery position P4, a rotary actuator 36 for turning the turntable 34 in the directions indicated by the arrow C in FIG. 5, a cylinder 38 having a pusher 38a for feeding a case 18 from the case delivery position P4 to the loading position P2, and a cylinder 40 disposed in confronting relation to the pusher 38a and having a receiver 40a for receiving a delivered case 18 in the loading position P2 and a movable body 40b on which the receiver 40a is disposed. The turntable 34 has a recess 34a defined therein which is open radially outwardly for holding a case 18 therein in a vertical attitude. A separating mechanism (not shown) for separating cases 18 intermittently at a predetermining timing from the supply path 20a is disposed at the lower end of the supply path 20a.

The case feed mechanism 20 also has a cylinder 42 that is reciprocally movable between the loading position P2 and the case cap mounting position P5, a movable body 42b that is reciprocally movable by the cylinder 42 and has a pusher 42a for feeding a case 18 to the case cap mounting position P5, and a case feed path 44 having a concave cross-sectional shape for guiding a case 18 from the case delivery position P4 to the case cap mounting position P5 in a vertical attitude.

As shown in FIGS. 5 through 8, the cartridge loading mechanism 22 has a cartridge holding means 50 for removing a cartridge 14 from the cartridge removal position P1, feeding the removed cartridge 14 to the loading position P2, and thereafter holding the cartridge 14 nonrotatably and inserting the cartridge 14 into a case 18, a case holding means 52 for holding a case 18 in the loading position P2, and a guide means 56 which is rotatable for winding a fixed-length film 12 projecting from a port 15 and guiding a cartridge 14 when the cartridge 14 is loaded into a case 18.

The cartridge loading mechanism 22 also has a delivery unit 60 for reciprocally moving the cartridge holding means 50 in the directions indicated by the arrow D between the cartridge removal position P1 and the loading position P2. The delivery unit 60 comprises a cylinder 60a fixedly mounted on an upstanding support 58 by an auxiliary plate 58a and a movable body 60b that is reciprocally movable by the cylinder 60a. The cartridge holding means 50 is fixedly mounted on the movable body 60b by a plate 61. The movable body 60b is positionally adjustable at each end of its reciprocally moving stroke, and is positioned at each stroke end by abutment against a stop (not shown) having a damping mechanism.

Figure 7:
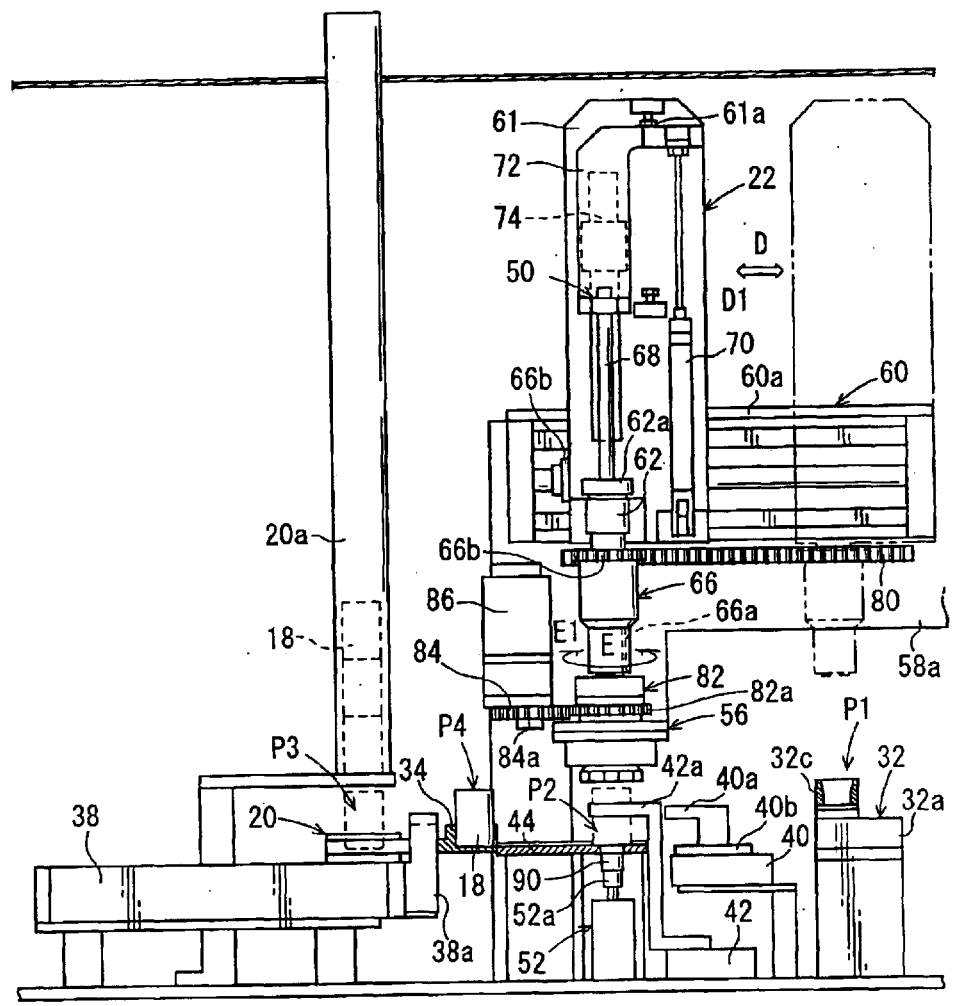
FIG. 7 is a front elevational view of the case feed mechanism and the cartridge loading mechanism shown in FIG. 5.

The cartridge holding means 50 has a bearing assembly 64 supported on a support bracket 62 by being fastened by a fastening member 62a and including a sliding member 64a such as a bearing or the like, and a tubular body 66 rotatably supported by the bearing assembly 64 for rotation in the directions indicated by the arrow E in FIG. 7. The tubular body 66 has an axially extending slit-like opening 66a defined in a lower end thereof and having a predetermined width in the circumferential direction. The tubular body 66 also has a gear 66b disposed on an upper end thereof and extending in the circumferential direction. The support bracket 62 is fixed to the plate 61.

The cartridge holding means 50 also has a vertically movable shaft 68 that is vertically movably housed in the tubular body 66. The vertically movable shaft 68 is vertically movably supported by a pair of bushings 64b disposed in a bore defined in the bearing member 64. The vertically movable shaft 68 has an upper end fixed to an end of a joint plate 72 that is connected to a vertically moving cylinder 70.

The joint plate 72 is vertically movable by the cylinder 70 while being guided by a linear guide 74. A holding member 78 including a magnet (first magnet) 76 for picking up a cartridge 14, which is made of iron or the like, and holding the cartridge 14 in a picked-up position is fixed to the lower end of the vertically movable shaft 68 by a connector 68a. The cartridge holding means 50 is limited to its upper limit position when a portion of the upper end of the joint plate 72 abuts against a stop 61a on the plate 61. The stop 61a is positionally adjustable.

A rack 80 is disposed on the auxiliary plate 58a and extends in the directions in which the cartridge holding means 50 is reciprocally movable. The gear 66b on the tubular body 66 is held in mesh with the rack 80. The rack 80 and the gear 66b jointly make up a tubular body rotating mechanism.

The guide means 56 has a guide tubular body 82 which is rotatable to hold the end 12a of the fixed-length film 12 projecting from the port 15 of a cartridge 14 around the cartridge 14 and guide the end 12a when the cartridge 14 is loaded into the case 18, and a motor 86 for rotating the guide tubular body 82 through a gear 84. The gear 84 has a shaft 84a rotatably coupled to a drive shaft (not shown) of the motor 86.

Figure 8:
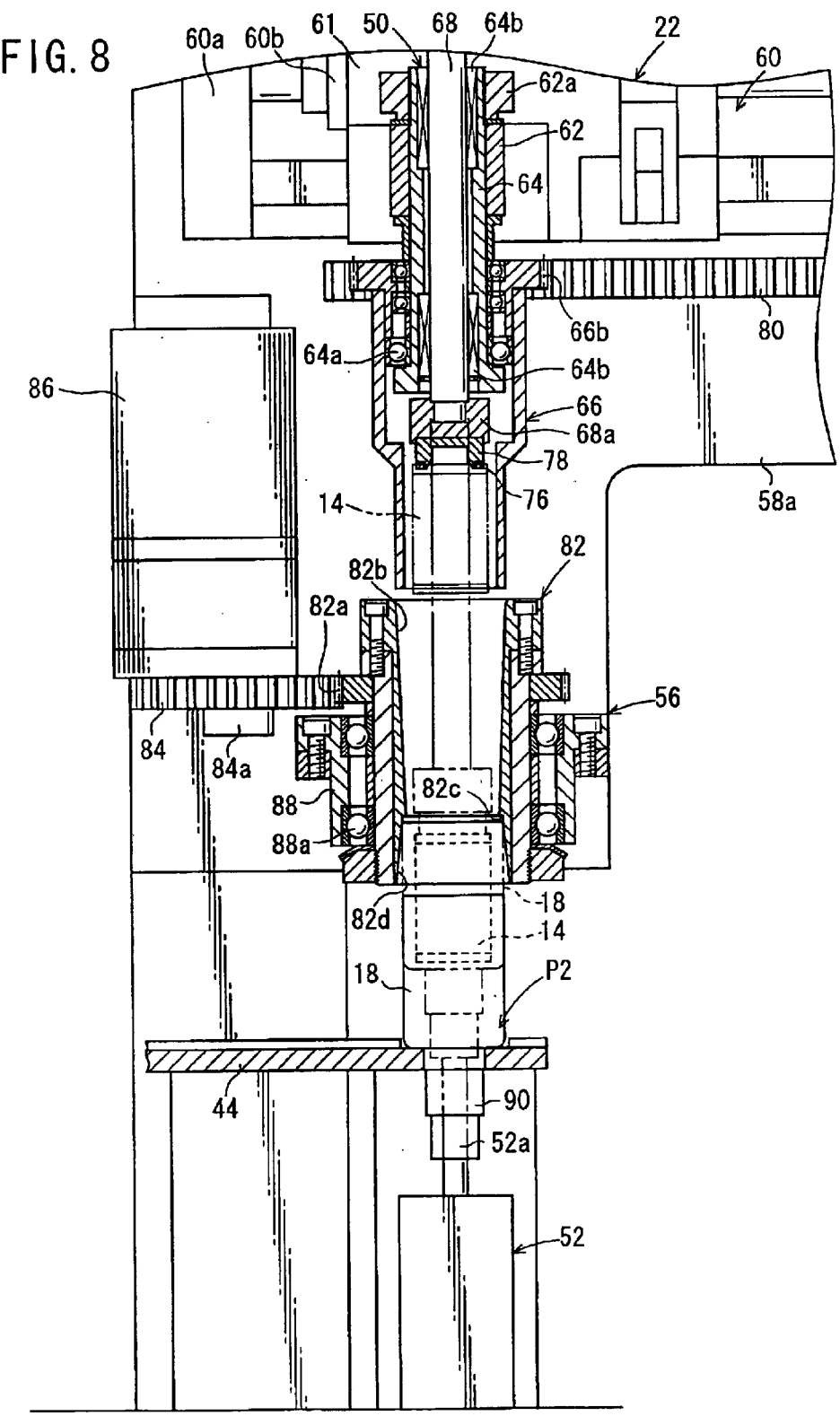
FIG. 8 is an enlarged fragmentary cross-sectional view of the cartridge loading mechanism shown in FIG. 7.

As shown in FIG. 8, the guide tubular body 82 has a gear 82a held in mesh with the gear 84, and is rotatably supported by a bearing assembly 88 including a sliding member 88a such as a bearing or the like. The bearing assembly 88 is fixed to the auxiliary plate 58a. The guide tubular body 82 has a tapered inner circumferential surface 82b for guiding the end 12a of the fixed-length film 12 wound around the cartridge 14 along the outer circumferential surface of the cartridge 14. The guide tubular body 82 also has a tapered opening 82d joined to the lower end of the tapered inner circumferential surface 82b and spreading progressively outwardly in the downward direction from a step 82c which is positioned between the tapered inner circumferential surface 82b and the tapered opening 82d. The gear 82a and the gear 84 jointly make up a guide tubular body rotating mechanism.

When a case 18 is lifted by the case holding means 52 and placed in the tapered opening 82d in the loading position P2, the upper end of the case 18 is spaced from the step 82c by a clearance which is in the range from 0.5 to 1.5 mm, or preferably in the range from 0.5 to 1.0 mm.

The tapered inner circumferential surface 82b of the guide tubular body 82 is inclined at an angle in the range from 1° to 11°. The diameter of the lower end of the tapered inner circumferential surface 82b is set to a value that is greater than the inside diameter of the case 18 and smaller than the outside diameter of the case 18.

As shown in FIG. 8, the case-holding means 52 has a vertically movable table 52a for holding a case 18 and vertically moving the case 18 between the case feed path 44 and the tapered opening 82. The vertically movable table 52a is vertically movable by an actuator (not shown). A magnet (second magnet) 90 is mounted on the upper end of the vertically movable table 52a. The magnet 90 has stronger magnetic forces than the magnet 76 described above.

As shown in FIGS. 9 through 12, the case cap mounting mechanism 28 has a case cap feeder 92 which comprises a general parts feeder for arraying case caps 24 in a predetermined direction, a chute 94 for successively feeding case caps 24 from the case cap feeder 92 to a cap removal position P6, a cap transfer unit 96 for gripping and picking up a case cap 24 fed to the cap removal position P6, and transferring the case cap 24 to the open end of a case 18 that is delivered to the case cap mounting position P5, a cap presser 98 for pressing the case cap 24 transferred to the open end of the case 18 thereby to mount the case cap 24 in the open end of the case 18, and a reciprocal actuator 100 for reciprocally moving the cap transfer unit 96 and the cap presser 98. The reciprocal actuator 100 is fixed to an upstanding support 101.

Figure 9:
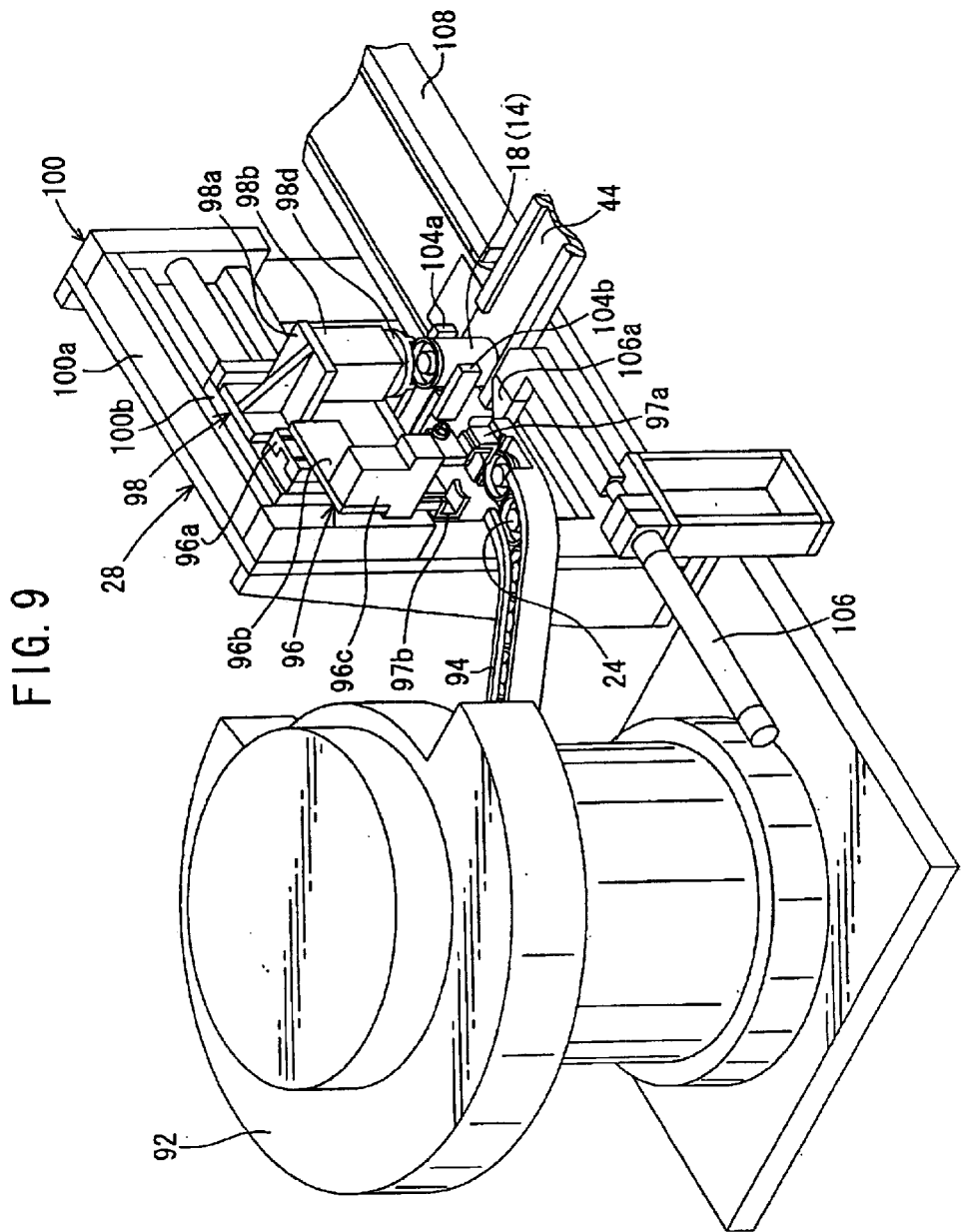
FIG. 9 is a perspective view of a case cap mounting mechanism of the manufacturing apparatus shown in FIG. 2.

The case cap mounting mechanism 28 also has a case gripper 104 for receiving a cap 18 fed to the case cap mounting position P5 and gripping the case 18 when the case cap 24 is mounted on the case 18. In FIG. 9, the reference characters 106, 106a denote a cylinder and a pusher, respectively, for delivering a packaged product 26 with a case cap 24 mounted in the case cap mounting position P5 to a feed conveyor 108.

Figure 10:
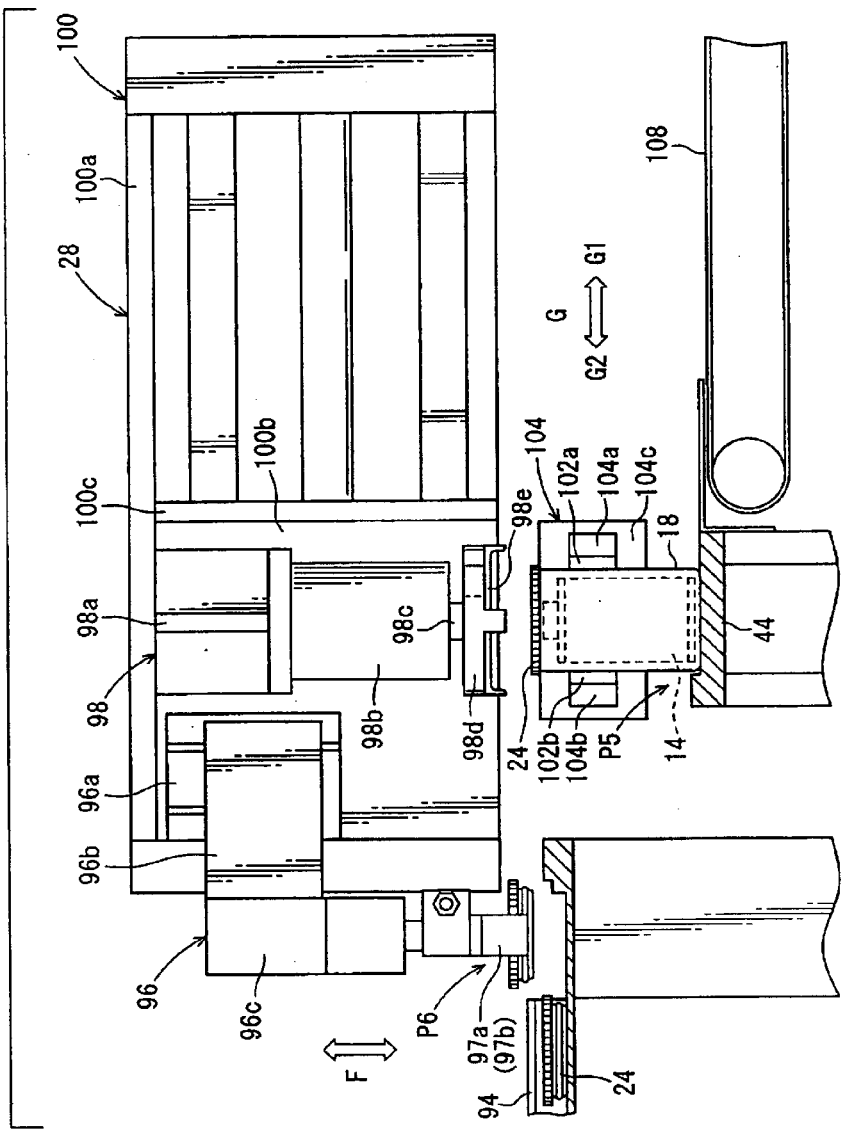
FIG. 10 is a front elevational view of the case cap mounting mechanism shown in FIG. 9.
Figure 11:
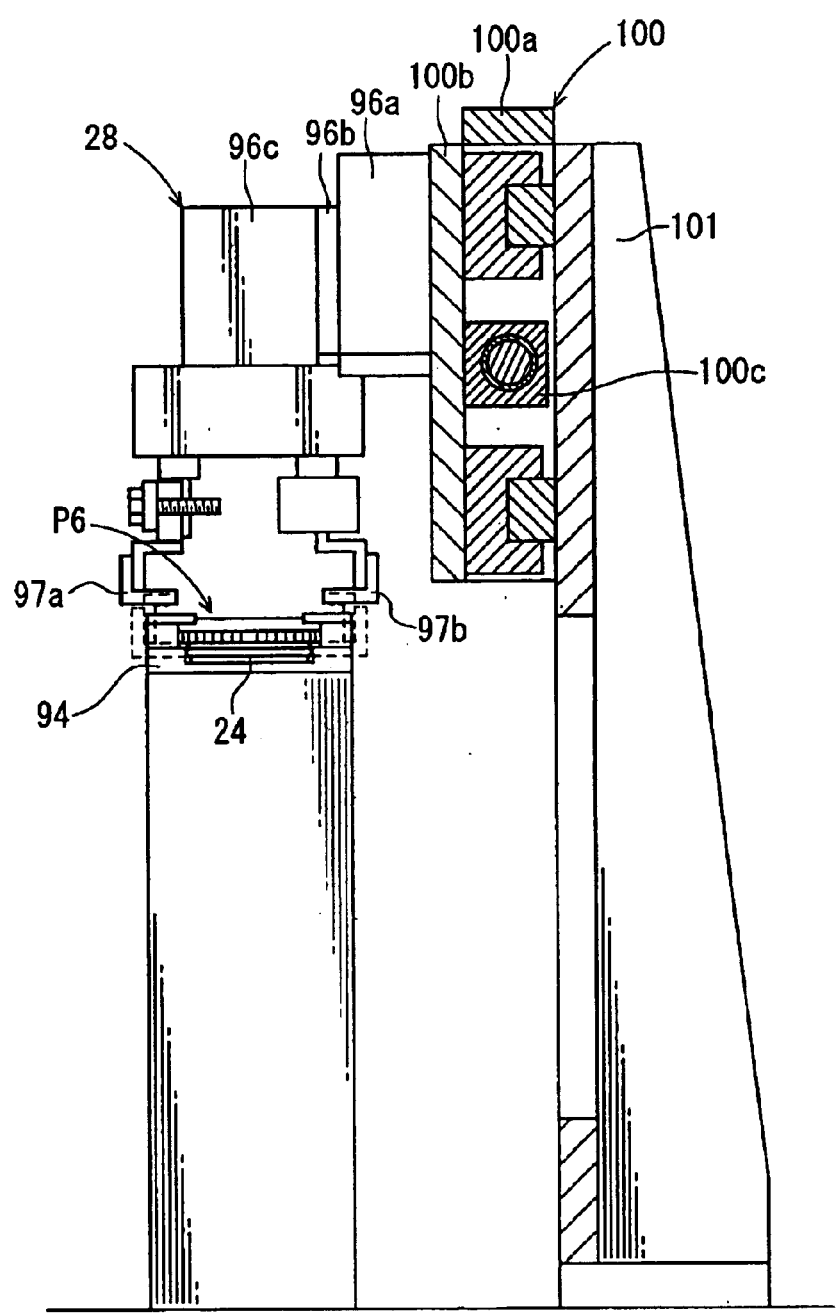
FIG. 11 is a side elevational view, partly in cross section, of a cap transfer unit of the case cap mounting mechanism shown in FIG. 9.

The cap transfer unit 96 has a cylinder 96a fixed to an auxiliary plate 100b, a movable body 96b that is vertically movable in the directions indicated by the arrow F in FIG. 10 by the cylinder 96a, a cylinder 96c fixed to the movable body 96b, and a pair of clamp members 97a, 97b that is operable and closable by the cylinder 96c. The clamp members 97a, 97b grip and pick up a case cap 24.

Figure 13:
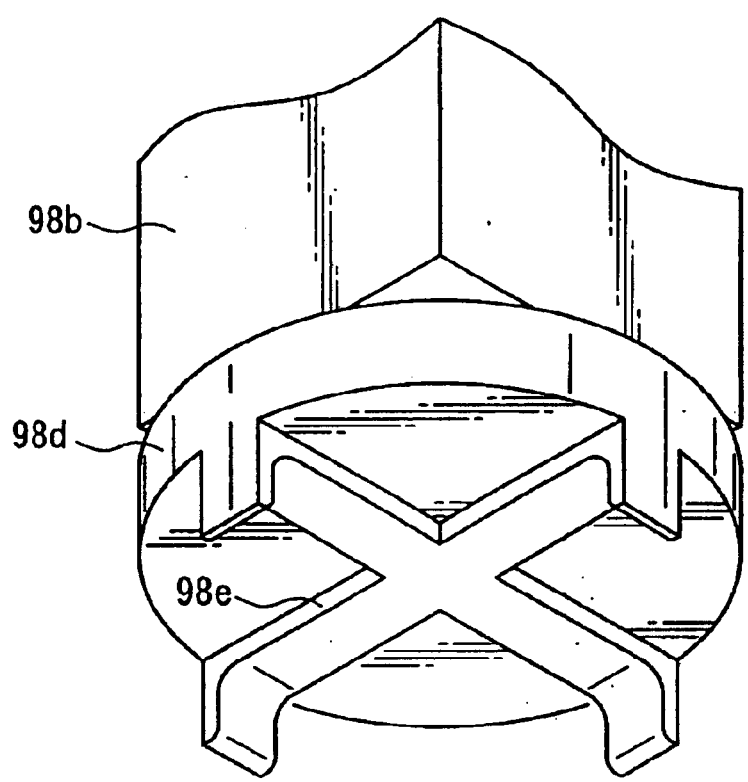
FIG. 13 is an enlarged perspective view of a pressing member of the cap presser shown in FIG. 12.

The cap presser 98 has a cylinder 98b supported by a bracket 98a fixed to the auxiliary plate 100b and vertically movable in the directions indicated by the arrow F in FIG. 10, and a pressing member 98d attached to the end of a drive rod 98c of the cylinder 98b (see FIG. 13). The pressing member 98d has a pressing region 98e disposed in confronting relation to the upper surface of a case cap 24 that is placed on the open end of a case 18. The pressing region 98e is substantially of a crisscross shape and has its peripheral edges bent and extending in the axial direction of the cylinder 98b. The pressing region 98e allows the pressing member 98d to abut partially against the upper surface of the case cap 24, thus pressing the case cap 24.

In the present embodiment, the pressing region 98e is substantially of a crisscross shape. However, the pressing region 98e is not limited to such a shape, but may be of any shape, such as a substantially Y or I shape having its peripheral edges bent and extending in the axial direction, insofar as it can abut partially against the upper surface of the case cap 24.

The reciprocal actuator 100 comprises a cylinder 100a that is reciprocally movable in the directions indicated by the arrow G between the cap mounting position P5 and the cap removal position P6, and a movable body 100c that is reciprocally movable by the cylinder 100a. The cap transfer unit 96 and the cap presser 98 are fixed to the movable body 100c by the auxiliary plate 100b.

Figure 12:
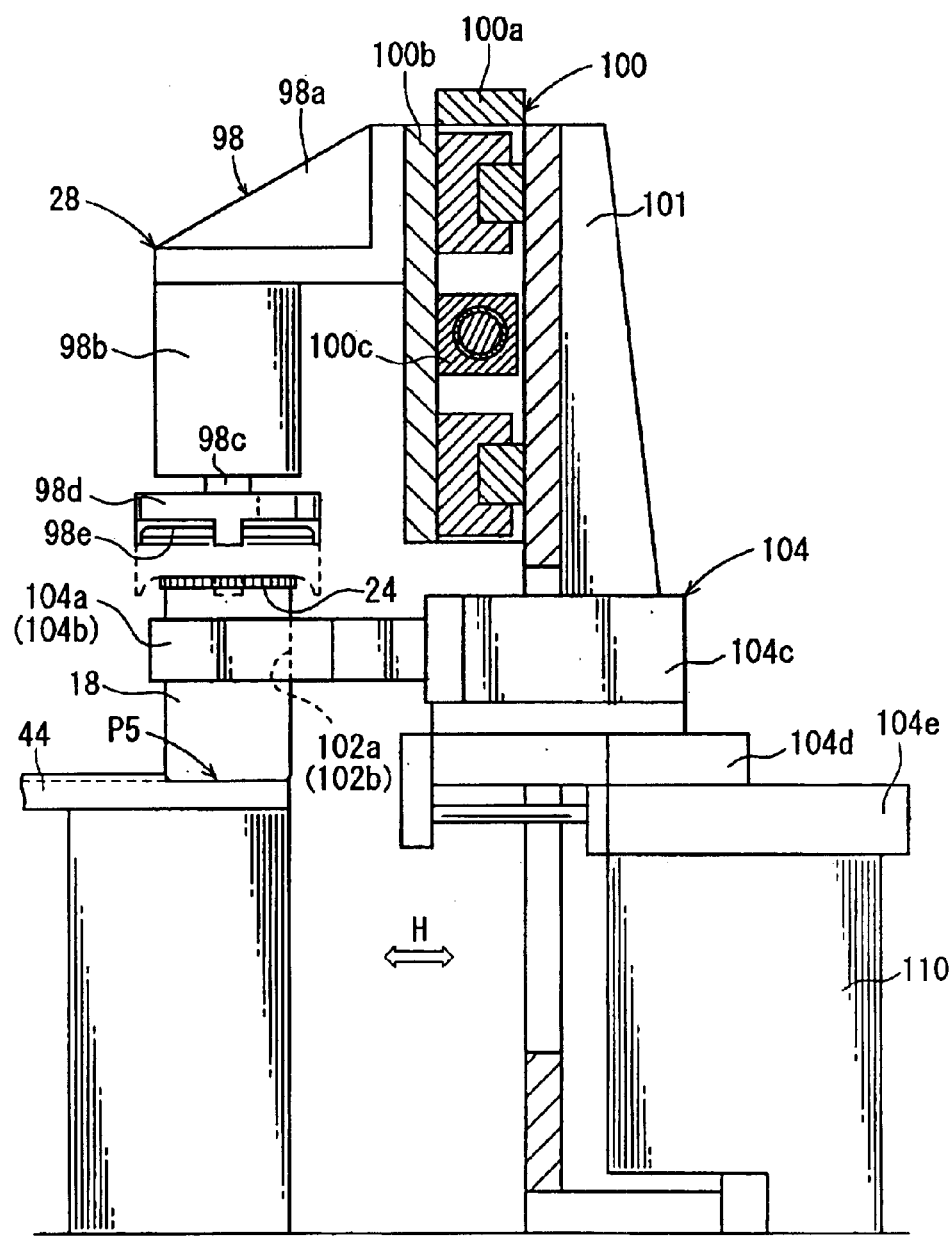
FIG. 12 is a side elevational view, partly in cross section, of a cap presser of the case cap mounting mechanism shown in FIG. 9.

The case gripper 104 has a pair of operable and closable chucks 104a, 104b for gripping a case 18 fed to the cap mounting position P5 on its opposite sides, the chucks 104a, 104b having respective barrels 102a, 102b for receiving the case 18, a cylinder 104c for opening and closing the chucks 104a, 104b, and a cylinder 104e for reciprocally moving a movable body 104d on which the cylinder 104c is fixedly mounted, in the directions indicated by the arrow H in FIG. 12. The chucks 104a, 104b are reciprocally movable by the cylinder 104e between the cap mounting position P5 and a retracted position to which chucks 104a, 104b are retracted-when the case 18 is fed out. The cylinder 104e is fixedly mounted on a mount base 110.

Operation and advantages of the manufacturing apparatus 10 thus constructed will be described below in reference to the method of manufacturing a packaged cartridge product according to the embodiment of the present invention.

First, a cartridge 14 housing a roll of fixed-length film 12 is delivered from the film winding mechanism 17 by the transfer mechanism 17b. The movable body 30e is lowered by the cylinder 30d of the cartridge transfer unit 30 and the clamp members 31a, 31b are opened and closed by the cylinder 30g to grip the delivered cartridge 14 with the end 12a of the fixed-length film 12 being oriented in a predetermined direction. When the movable body 30e is lifted, the cartridge 14 is picked up from the transfer mechanism 17b (see FIGS. 3 and 4).

The cartridge 14 is moved in the direction indicated by the arrow A1 in FIG. 3 toward the cartridge feeder 32 by the movable body 30b that is moved by the cylinder 30a. Thereafter, the movable body 30e is lowered to place the cartridge 14 into the bucket 32c of the cartridge feeder 32, and the cartridge 14 is released from the clamp members 31a, 31b (see FIG. 1 at (a) and FIGS. 3 and 4). At this time, the end 12a of the fixed-length film 12 projects from the cartridge 14 is inserted in the slit 32d of the bucket 32c.

Figure 6:
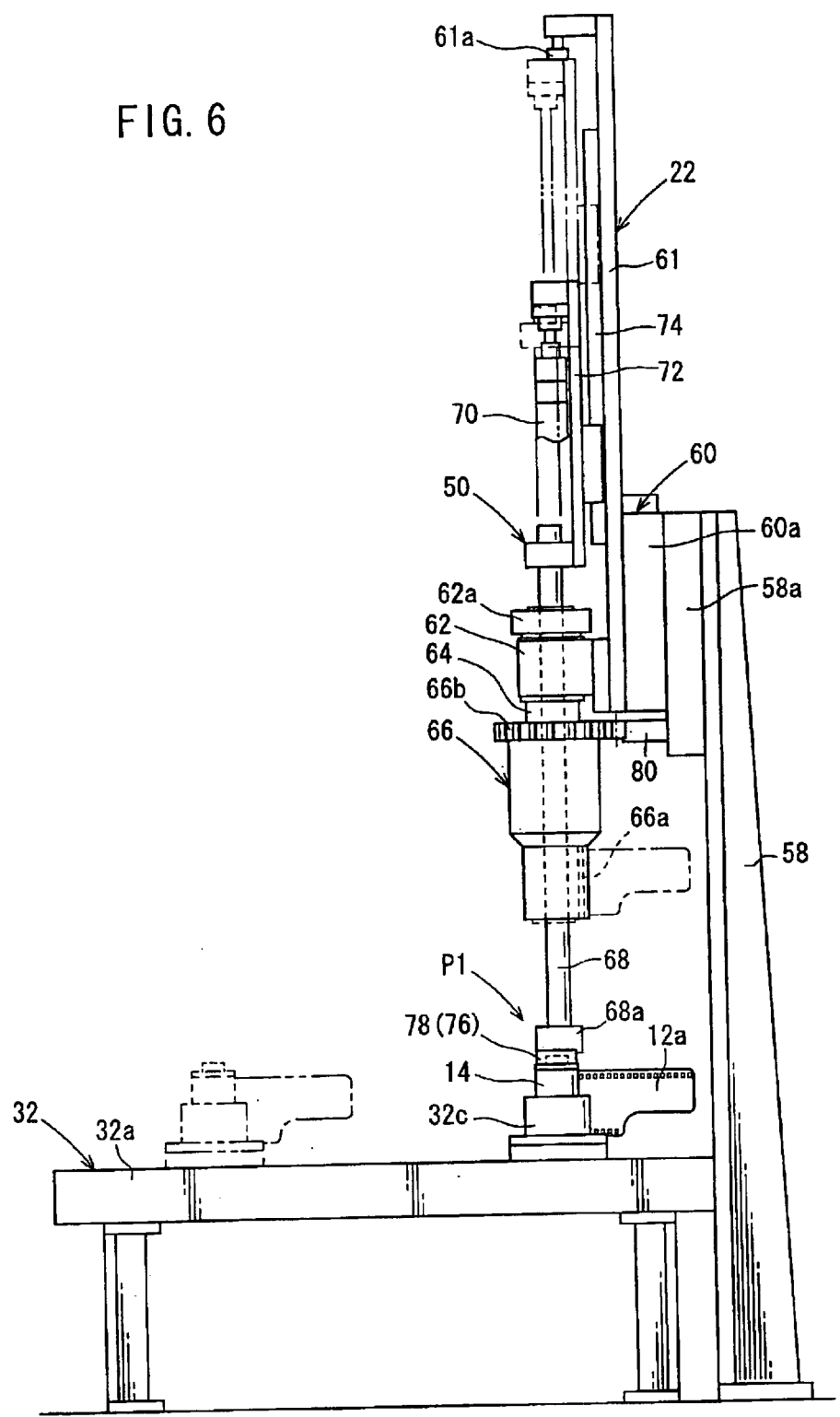
FIG. 6 is a side elevational view of the cartridge loading mechanism shown in FIG. 5 at a cartridge removal position.

The cartridge 14 placed in the bucket 32c is then fed to the cartridge removal position P1 by the movable body 32b that is moved by the cylinder 32a of the-cartridge feeder 32 (see FIGS. 5 and 6).

The cartridge 14 that is placed in the cartridge removal position P1 is then attracted and held by the magnet 76 of the holding member 78 when the vertically movable shaft 68 is lowered by the cylinder 70 while being guided by the linear guide 74 of the cartridge loading mechanism 22. When the cartridge 14 thus held is elevated, the cartridge 66 is introduced into the tubular body 66, and the end 12a of the fixed-length film 12 projects outwardly from the slit-like opening 66a of the tubular body 66 (see FIG. 6).

Then, the movable body 60b is moved by the cylinder 60a of the delivery unit 60 of the cartridge loading mechanism 22, delivering the cartridge 14 to a position above the loading position P2, i.e., the guide tubular body 82 of the guide means 56. At this time, since the gear 66b on the tubular body 66 is held in mesh with the rack 80 on the auxiliary plate 58a, the gear 66b and the tubular body 66 rotate about their axes in unison with each other in the direction indicated by the arrow E1 while the movable body 60b is moving from the cartridge removal position P1 to the loading position P2. The end 12a of the fixed-length film 12 which has projected outwardly from the slit-like opening 66a of the tubular body 66 is now pulled through the slit-like opening 66a into the tubular body 66, and is wound around the cartridge 14 (see FIG. 1 at (b) and FIGS. 7 and 8).

In the loading position P2, the cartridge 14 fed to the position above the guide tubular body 82 is inserted into the guide tubular body 82 when the holding member 78 is lowered together with the vertically movable shaft 68 by the cylinder 70. At this time, the guide tubular body 82 is being rotated clockwise by the motor 86. Consequently, the end 12a of the fixed-length film 12 wound around the cartridge 14 is held on the outer circumferential surface of the cartridge 14 by being guided by the tapered inner circumferential surface 82b of the guide tubular body 82 that is rotating clockwise (see FIG. 1 at (b) and FIG. 8).

A case 18 is fed through the supply path 20a and placed in the recess 34a in the turntable 34 of the case feed mechanism 20 in the case supply position P3. The case 18 placed in the recess 34a is then fed to the case delivery position P4 by the turntable 34 that is turned in the direction indicated by the arrow C1 (see FIG. 5) by the rotary actuator 36 (see FIG. 2).

The case 18 that is placed in the case delivery position P4 is then sent to a position below the loading position P2 on the case feed path, i.e., the guide tubular body 82 of the guide means 56, by the pusher 38a actuated by the cylinder 38 (see FIG. 1 at (c) and FIGS. 7 and 8). At this time, the movable body 40b disposed in confronting relation to the pusher 38a is actuated by the cylinder 40, causing the receiver 40a to receive and place the case 18 reliably in the loading position P2.

The vertically movable table 52a of the case holding means 52 is lifted into contact with the bottom of the case 18 on the case feed path 44, and is further lifted to elevate the case 18 into the guide tubular body 82 as the case 18 is guided through the tapered opening 82d. The vertically movable table 52a is lifted such that a predetermined clearance is provided between the upper end of the case 18 and the step 82c in the guide tubular body 82, while the vertically movable table 52a is holding the case 18.

When the case 18 reaches a predetermined position in the rotating guide tubular body 82, the cartridge 14 that is nonrotatably held by the cartridge holding means 50 is moved to a position below the rotating guide tubular body 82. The cartridge 14 is then loaded into the case 18 (see FIG. 1 at (d) and FIG. 8).

After the cartridge 14 is loaded fully into the case 18, the holding member 78 starts to be lifted. At this time, since the cartridge 14 loaded in the case 18 is magnetically attracted by the magnet 90 mounted on the vertically movable table 52a which has stronger magnetic forces than the magnet 76 of the holding member 78, the cartridge 14 remains loaded in the case 18.

With the case 18 being held by the case holding means 52 having the magnet 90, the cartridge 14 is nonrotatably held and moved downwardly by the holding member 78 which includes the magnet 76, and the guide tubular body 82 which guides the cartridge 14 clockwise. Therefore, the end 12a of the fixed-length film 12 that is wound around the cartridge 14 is reliably held against the outer circumferential surface of the cartridge 14 by being guided by the tapered circumferential surface 82b of the guide tubular body 82. The cartridge 14 is thus smoothly and reliably loaded in the case 18.

As the cartridge 14 is transferred under the difference between the magnetic forces of the magnets 76, 90, it is not necessary to employ a supply of compressed air for applying compressed air or a supply of negative-pressure air for attracting the cartridge, unlike the conventional arrangements. As a result, the manufacturing apparatus 10 can be reduced in size and simplified in structure, and can be manufactured inexpensively.

The holding member 78 is then moved by the cartridge holding means 50 and the delivery unit 60 to the cartridge removal position P1, and operates to hold a next cartridge 14.

The case 18 with the cartridge 14 loaded therein is placed on the case feed path 44 again as the case holding means 52 descends. After the case 18 with the cartridge 14 loaded therein is placed on the case feed path 44, the vertically movable table 52a is further lowered and stopped at a lowermost position (see FIG. 8).

Then, the case 18 is delivered to the cap mounting position P5 on the case feed path 44 by the pusher 42a actuated by the cylinder 42 of the case feed mechanism 20 (see FIG. 1 at (d) and FIGS. 9 and 12). At this time, the chucks 104a, 104b disposed in confronting relation to the pusher 42a are actuated by the cylinder 104c, causing the barrels 102a, 102b to hold the delivered case 18 and place the case 18 reliably in the cap mounting position P5. At the same time, the chucks 104a, 104b actuated by the cylinder 104c grips the case 18 immovably.

Case caps 24 are successively fed from the case cap feeder 92 of the case cap mounting mechanism 28 along the chute 94 to the cap removal position P6 (see FIG. 1 at (e)). A case cap 24 that is fed to the cap removal position P6 is lowered by the cylinder 96a of the cap transfer unit 96, and gripped by the clamps 97a, 97b that are opened and closed by the cylinder 96c. The case cap 24 is then picked up when the cylinder 96a is elevated (see FIG. 11).

Then, the cylinder 100a of the reciprocal actuator 100 is operated to move the movable body 100c in the direction indicated by the arrow G1 (see FIG. 10) to a position above the cap mounting position P5, i.e., the case 18 that has been placed in the cap mounting position P5 (see FIG. 9). The case cap 24 is then lowered by the cylinder 96a, and released from the clamps 97a, 97b that are opened by the cylinder 96c. Upon ascent of the cylinder 96a, the case cap 24 is placed on the open end of the case 18.

The cylinder 100a of the reciprocal actuator 100 is operated to move the movable body 100c in the direction indicated by the arrow G2 (see FIG. 10). The cap transfer unit 96 grips and picks up a next cap 24 in the cap removal position P6. Simultaneously, in the cap mounting position, the cap presser 98 disposed above the case 18 presses the case cap 24 toward the case 18 with the pressing member 98d that is lowered by the cylinder 98b, thus mounting the case cap 24 in the open end of the case 18. In this manner, a packaged product 26 having the cartridge 14 housed in the case 18 is produced (see FIG. 1 at (f)).

The pressing member 98d has the pressing region 98e which is substantially of a crisscross shape and faces the upper surface of the case cap 24. The pressing force from the pressing member 98d is partially borne by the case cap 24 because of the pressing region 98e (see FIG. 13). Therefore, the case cap 24 as it is mounted in the case 18 is slightly deformed between its portion that is held against the pressing region 98e and its portion that is not held against the pressing region 98e. Accordingly, the case cap 24 is easily and reliably mounted in the open end of the case 18.

Since the pressing member 98d is pressed against a partial upper surface of the case cap 24, the pressing force applied from the cap presser 98 to the case cap 24 is made stabler than if the pressing member 98d were pressed against the entire upper surface of the case cap 24. Therefore, the pressing force that is required can be saved. As a result, the case cap 24 and the case 18 are prevented from being unduly damaged.

Thereafter, the packaged product 26 is delivered from the cap mounting position P5 to the feed conveyor 108 by the pusher 106a that is actuated by the cylinder 106 (see FIGS. 2 and 9).

Although a certain preferred embodiment of the present invention has been shown and described in detail, it should be understood that various changes and modifications may be made therein without departing from the scope of the appended claims.

What is claimed is:

1. A method of manufacturing a packaged cartridge product having a cartridge which houses a roll of fixed-length film and is accommodated in a case, and a case cap mounted in an open end of the case, said method comprising the steps of:

holding the cartridge with a first magnet and winding an end of the fixed-length film projecting out from said cartridge around said cartridge; and moving said cartridge with the end of the fixed-length film wound therearound toward the case, and attracting said cartridge with a second magnet having stronger magnetic forces than said first magnet to accommodate said cartridge in said case.

2. A method according to claim 1, further comprising the steps of:

placing said cartridge in a tubular body, with the end of the fixed-length film projecting out from a slit-like opening defined in an outer circumferential wall of said tubular body, and rotating said tubular body about an axis of said cartridge to wind the end of the fixed-length film around said cartridge.

3. A method according to claim 1, further comprising the step of:

accommodating said cartridge in said case with a guide tubular body which rotates in a direction in which said end of the fixed-length film is wound.

4. A method of manufacturing a packaged cartridge product having a cartridge which houses a roll of fixed-length film and is accommodated in a case, and a case cap mounted in an open end of the case, said method comprising the steps of:

placing the case cap on the open end of the case with said cartridge accommodated therein; and pressing said case cap with a pressing member which partially abuts against an upper surface of the case cap for mounting said case cap in the open end of said case, wherein said step of pressing the case cap is performed in synchronism with gripping a next case cap.

5. A method of manufacturing a packaged cartridge product having a cartridge which houses a roll of fixed-length film and is accommodated in a case, and a case cap mounted in an open end of the case, said method comprising the steps of:

holding the cartridge with a first magnet and winding an end of the fixed-length film projecting out from said cartridge around said cartridge;

moving said cartridge with the end of the fixed-length film wound therearound toward the case, and attracting said cartridge with a second magnet having stronger magnetic forces than said first magnet to accommodate said cartridge in said case;

placing the case cap on the open end of the case with said cartridge accommodated therein; and pressing said case cap with a pressing member which partially abuts against an upper surface of the case cap for mounting said case cap in the open end of said case.

6. An apparatus for manufacturing a packaged cartridge product having a cartridge which houses a roll of fixed-length film and is accommodated in a case, and a case cap mounted in an open end of the case, said apparatus comprising:

cartridge holding means for holding the cartridge with a first magnet inserting the cartridge into the case;

case holding means for holding said case, said case holding means including a second magnet having stronger magnetic forces than said first magnet; and guide means including a guide tubular body for guiding said cartridge to said case and supporting an end of the fixed-length film projecting out from said cartridge on an outer circumferential surface of around said cartridge.

7. An apparatus according to claim 6, wherein said cartridge holding means comprises:
- a tubular body for housing said cartridge, said tubular body having a slit-like opening defined in an outer circumferential wall thereof for allowing the end of the fixed-length film to project therethrough out from the tubular body; and
- a tubular body rotating mechanism for rotating said tubular body about an axis of said cartridge.

8. An apparatus according to claim 6, wherein said guide means has a guide tubular body rotating mechanism for rotating said guide tubular body in a direction in which the end of the fixed-length film is wound around said cartridge.

9. An apparatus for manufacturing a packaged cartridge product having a cartridge which houses a roll of fixed-length film and is accommodated in a case, and a case cap mounted in an open end of the case, said apparatus comprising:
- a mounting mechanism having a pressing member for partially abutting against an upper surface of the case cap for pressing and mounting said case cap in the open end of said case with the cartridge accommodated therein;

wherein said pressing member has a pressing region which is substantially of a crisscross shape, a Y shape, or an I shape, and faces an upper surface of said case cap.

10. An apparatus for manufacturing a packaged cartridge product having a cartridge which houses a roll of fixed-length film and is accommodated in a case, and a case cap mounted in an open end of the case, said apparatus comprising:
- cartridge holding means for holding the cartridge with a first magnet inserting the cartridge into the case;
- case holding means for holding said case, said case holding means including a second magnet having stronger magnetic forces than said first magnet;
- guide means including a guide tubular body for guiding said cartridge to said case and supporting an end of the fixed-length film projecting out from said cartridge on an outer circumferential surface of around said cartridge; and
- a mounting mechanism having a pressing member for partially abutting against an upper surface of the case cap for pressing and mounting said case cap in the open end of said case with the cartridge accommodated therein.

* * * * *